United States Patent
Otagaki

(10) Patent No.: US 12,515,660 B2
(45) Date of Patent: Jan. 6, 2026

(54) VEHICLE CONTROL DEVICE, OPERATION METHOD OF VEHICLE CONTROL DEVICE, AND STORAGE MEDIUM

(71) Applicant: HONDA MOTOR CO., LTD., Tokyo (JP)

(72) Inventor: Toru Otagaki, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 114 days.

(21) Appl. No.: 18/414,595

(22) Filed: Jan. 17, 2024

(65) Prior Publication Data
US 2024/0317225 A1    Sep. 26, 2024

(30) Foreign Application Priority Data
Mar. 24, 2023   (JP) ................................. 2023-048536

(51) Int. Cl.
*B60W 30/16* (2020.01)

(52) U.S. Cl.
CPC ....... *B60W 30/16* (2013.01); *B60W 2520/105* (2013.01); *B60W 2554/4026* (2020.02); *B60W 2554/4041* (2020.02); *B60W 2554/802* (2020.02); *B60W 2720/106* (2013.01); *B60W 2754/30* (2020.02)

(58) Field of Classification Search
CPC .... B60W 10/06; B60W 10/184; B60W 30/16; B60W 50/085; B60W 50/14; B60W 2050/146; B60W 2300/36; B60W 2420/403; B60W 2420/408; B60W 2420/54; B60W 2520/10; B60W 2520/105; B60W 2554/402; B60W 2554/4026; B60W 2554/4041; B60W 2554/4049; B60W 2554/801; B60W 2554/802; B60W 2554/804; B60W 2720/10; B60W 2720/106; B60W 2754/30; B60W 2754/50
See application file for complete search history.

(56) References Cited

U.S. PATENT DOCUMENTS

2019/0248367 A1* 8/2019 Knitt ................... B60W 10/184
2020/0298885 A1* 9/2020 Yashiro ............. B60W 60/0053
(Continued)

FOREIGN PATENT DOCUMENTS

JP    2013-067302 A    4/2013
JP    2019-185800 A    10/2019

*Primary Examiner* — Peter D Nolan
*Assistant Examiner* — Ce Li Li
(74) *Attorney, Agent, or Firm* — Thomas | Horstemeyer, LLP

(57) ABSTRACT

A vehicle control device comprising: a recognition unit configured to recognize a vehicle ahead of a self-vehicle; and a control unit configured to conduct following control of following a target vehicle, based on a recognition result of the recognition unit, wherein in a case where a plurality of vehicles are recognized as a group by the recognition unit, the control unit determines a following acceleration of the self-vehicle, based on an acceleration smaller than a maximum acceleration of respective accelerations of respective vehicles included in the group, and determines the target vehicle, based on respective distances from the self-vehicle to the respective vehicles, and the control unit conducts the following control of following the target vehicle at the following acceleration determined.

17 Claims, 5 Drawing Sheets

(56) References Cited

U.S. PATENT DOCUMENTS

| | | | |
|---|---|---|---|
| 2022/0135033 A1* | 5/2022 | Grelaud | B60W 30/16 |
| | | | 303/137 |
| 2023/0124314 A1* | 4/2023 | Foster | B60W 60/0011 |
| | | | 701/26 |
| 2024/0075926 A1* | 3/2024 | Igari | B60W 30/16 |
| 2024/0208509 A1* | 6/2024 | Tateishi | G06V 20/625 |
| 2024/0217610 A1* | 7/2024 | Pfau | B60W 30/16 |
| 2024/0326808 A1* | 10/2024 | Pfau | B60W 50/14 |

* cited by examiner

F I G. 4
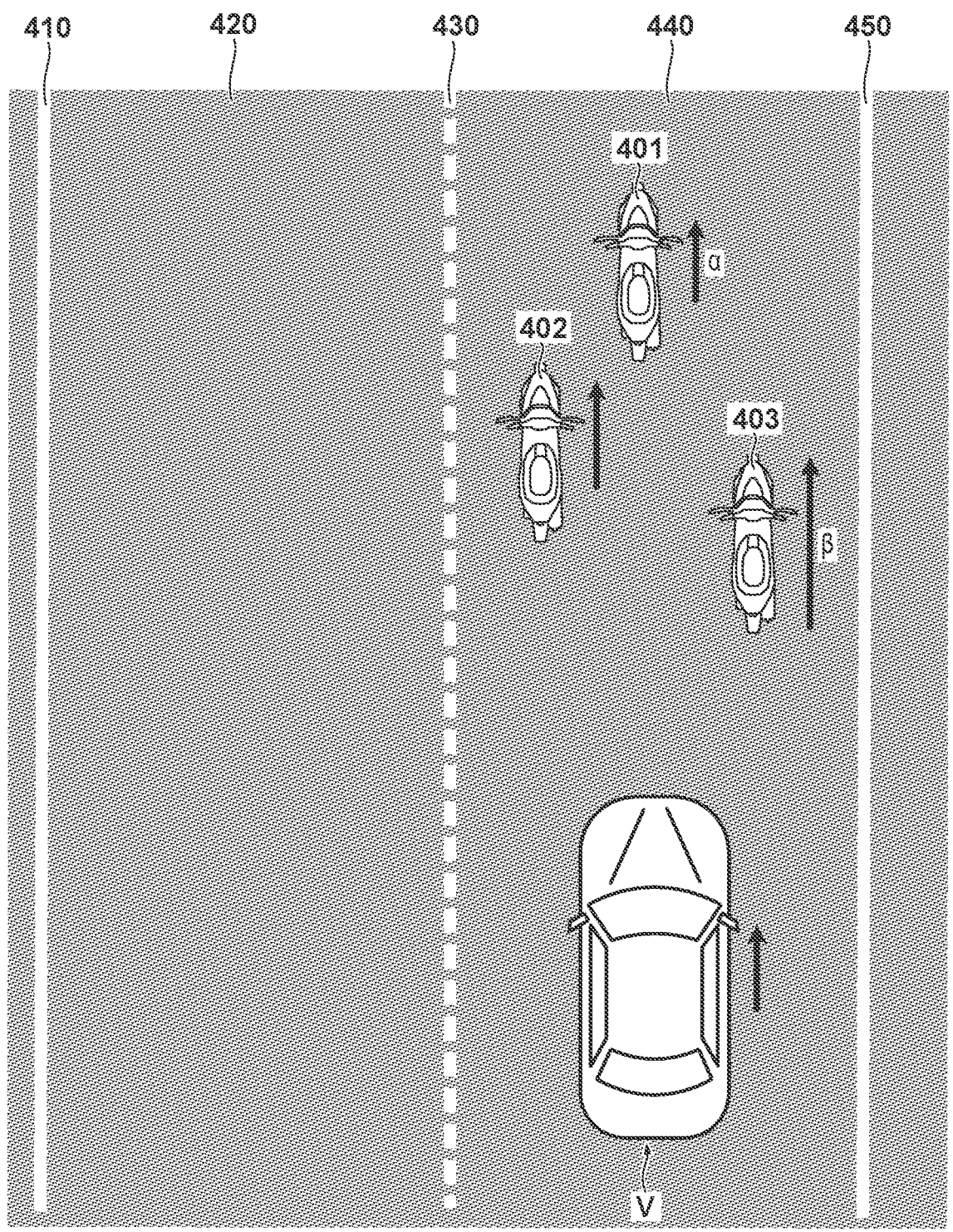

VEHICLE CONTROL DEVICE, OPERATION METHOD OF VEHICLE CONTROL DEVICE, AND STORAGE MEDIUM

CROSS-REFERENCE TO RELATED APPLICATION(S)

This application claims priority to and the benefit of Japanese Patent Application No. 2023-048536, filed Mar. 24, 2023, the entire disclosure of which is incorporated herein by reference.

BACKGROUND OF THE INVENTION

Field of the Invention

The present invention relates to a vehicle control device, an operation method of the vehicle control device, and a storage medium.

Description of the Related Art

Japanese Patent Laid-Open No. 2013-067302 discloses conducting following travel control of following a target vehicle to be followed that is located in an identical advancing direction to that of a self-vehicle and located in a different lane, by using information acquired from the vehicle to be followed on inter-vehicle communication, while traveling in the identical advancing direction to that of the vehicle to be followed and traveling in the different lane. Japanese Patent Application Laid-Open No. 2019-185800 discloses that information of a group of motorcycles is acquired by using inter-vehicle communication.

However, start timings and accelerations of the respective vehicles in a group of vehicles are not identical, and vary depending on the vehicle. In a case where a plurality of vehicles are regarded as one group, riding comfort of an occupant of a vehicle that follows may change depending on which vehicle is followed at what acceleration.

SUMMARY OF THE INVENTION

The present invention has been made in view of the above issues, and provides a technique that enables comfortable following travel in a case where a target to be followed is a group including a plurality of vehicles.

According to one aspect of the present invention, there is provided a vehicle control device comprising: a recognition unit configured to recognize a vehicle ahead of a self-vehicle; and a control unit configured to conduct following control of following a target vehicle, based on a recognition result of the recognition unit, wherein in a case where a plurality of vehicles are recognized as a group by the recognition unit, the control unit determines a following acceleration of the self-vehicle, based on an acceleration smaller than a maximum acceleration of respective accelerations of respective vehicles included in the group, and determines the target vehicle, based on respective distances from the self-vehicle to the respective vehicles, and the control unit conducts the following control of following the target vehicle at the following acceleration determined.

BRIEF DESCRIPTION OF THE DRAWINGS

FIG. 4 is an explanatory diagram of an application scene of processing according to an embodiment.

DESCRIPTION OF THE EMBODIMENTS

Figure 1:
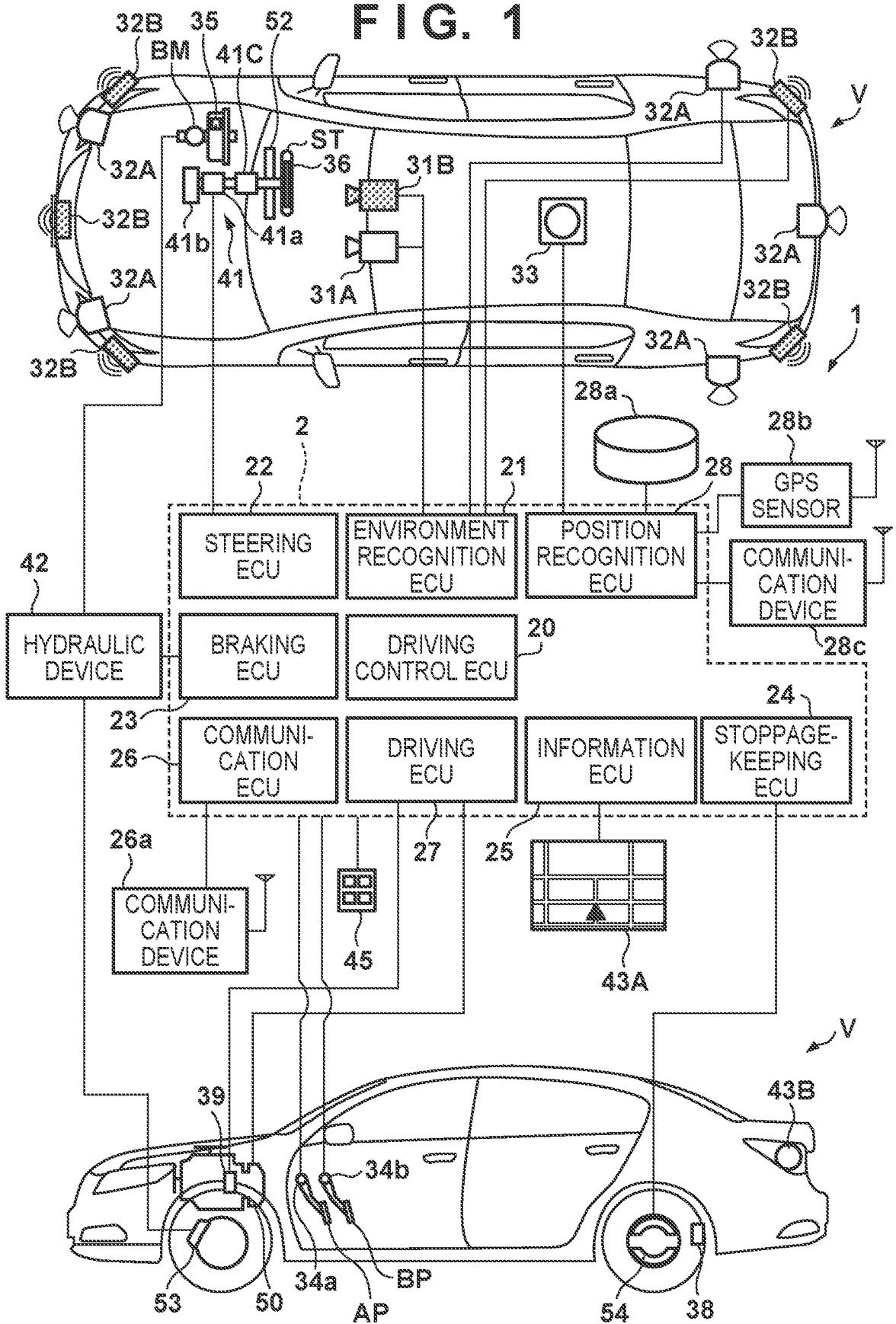
FIG. 1 is a block diagram of a vehicle and a vehicle control device according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a vehicle V and a vehicle control device 1 thereof according to an embodiment of the present invention. The vehicle control device 1, as a vehicle control device, conducts several types of vehicle control in the vehicle V. In FIG. 1, the vehicle Vis schematically illustrated in a plan view and a side view. The vehicle Vis, for example, a four-wheeled sedan passenger vehicle.

The vehicle V in the present embodiment is, for example, a parallel hybrid vehicle. In this case, a power plant 50, which is a traveling driving unit that outputs driving force for rotating driving wheels of the vehicle V, can include an internal combustion engine, a motor, and an automatic transmission. The motor can be used as a drive source for accelerating the vehicle V, and can also be used as a generator at the time of deceleration or the like (regenerative braking).

<Control Device>

A configuration of the vehicle control device 1, which is a device mounted on the vehicle V, will be described with reference to FIG. 1. The vehicle control device 1 includes an ECU group (electronic control unit group) 2. The ECU group 2 includes a plurality of ECUs 20 to 28, which are capable of communicating with one another. Each ECU includes a processor represented by a CPU, a storage device such as a semiconductor memory, an interface with an external device, and the like. The storage device stores programs executed by the processor, data used by the processor for processing, and the like. Each ECU may include a plurality of processors, storage devices, interfaces, and the like. Note that the number of ECUs and functions assigned to the ECUs can be designed as appropriate, and the ECUs and functions can be subdivided or integrated, when compared with the present embodiment. Note that in FIG. 1, names of representative functions are given to the ECUs 20 to 28. For example, the ECU 20 is expressed as "driving control ECU". In addition, each of the ECUs 20 to 28 may have one or more processors and execute a predetermined program to implement various operations, or may implement various operations on dedicated hardware.

The ECU 20 conducts control related to driving assistance including automated driving of the vehicle V. In the automated driving, driving (acceleration or the like of the vehicle V by the power plant 50), steering, and braking of the vehicle V are automatically conducted without necessitating a driver's operation. In addition, in manual driving, the ECU 20 is capable of conducting traveling assistance control such as collision mitigation braking and lane deviation suppression, for example. The collision mitigation braking instructs activation of a brake device 53 to assist collision avoidance, when the possibility of a collision with an obstacle present ahead increases. The lane deviation suppression instructs activation of an electric power steering device 41 to assist lane deviation avoidance, when the possibility that the vehicle V deviates from a lane increases. Further, the ECU 20 is capable of conducting automated following control for causing the vehicle V to automatically follow a preceding vehicle in both automated driving and manual driving. In the case of automated driving, all of acceleration, deceleration, and steering of the vehicle V may be automatically performed. In the case of manual driving, acceleration and deceleration of the vehicle V may be automatically performed.

The ECU 21 is an environment recognition unit that recognizes a traveling environment of the vehicle V, based on detection results by detection units 31A, 31B, 32A, and 32B that detect a surrounding situation of the vehicle V. In the present embodiment, the detection units 31A and 31B are cameras that capture images of a forward side of the vehicle V (hereinafter, also referred to as the camera 31A and the camera 31B) and are attached to the vehicle interior side of a windshield at a front part of the roof of the vehicle V. By analyzing the image captured by the camera 31A, it is possible to extract a contour of a target object or extract a division line (white line or the like) of a lane on a road.

In the present embodiment, the detection unit 32A is a light detection and ranging (LiDAR) (hereinafter, referred to as the LiDAR 32A, in some cases), detects a target object in the surroundings of the vehicle V, and measures a distance to the target object. In the present embodiment, five LiDARs 32A are provided, including one at each corner portion of a front part of the vehicle V, one at the center of a rear part of the vehicle V, and one at each lateral side of the rear part of the vehicle V. The detection unit 32B is a millimeter-wave radar (hereinafter, referred to as the radar 32B, in some cases), detects a target object in the surroundings of the vehicle V, and measures a distance to the target object. In the present embodiment, five radars 32B are provided, including one at the center of the front part of the vehicle V, one at each corner portion of the front part of the vehicle V, and one at each corner portion of the rear part of the vehicle V.

The ECU 22 is a steering control unit that controls the electric power steering device 41. The electric power steering device 41 includes a mechanism that steers front wheels in response to a driver's driving operation (steering operation) on a steering wheel ST. The electric power steering device 41 includes a driving unit 41a including a motor that exerts driving force for assisting a steering operation or automatically steering the front wheels (referred to as steering assist torque, in some cases), a steering angle sensor 41b, a torque sensor 41c that detects steering torque burdened by the driver (referred to as steering burden torque to be distinguished from steering assist torque). The ECU 22 is also capable of acquiring a detection result by a sensor 36, which detects whether the driver grips the steering wheel ST, and is capable of monitoring a grip state of the driver.

Blinker levers 51 and 52 are provided in the vicinity of the steering wheel ST. An occupant is able to operate left and right direction indicator lamps (not illustrated) by operating the blinker levers 51 and 52. In addition, in the present embodiment, the occupant is able to give an instruction of automatic course change of the vehicle V by operating the blinker levers 51 and 52. As the instruction of automatic course change, for example, the occupant is able to give an instruction to change the lane to a left lane by operating the blinker lever 51, and is able to give an instruction to change the lane to a right lane by operating the blinker lever 52. The instruction to change the course by the occupant may be acceptable during automated driving or automatic following control.

The ECU 23 is a braking control unit that controls a hydraulic device 42. The driver's braking operation on a brake pedal BP is converted into hydraulic pressure in a brake master cylinder BM, and is transmitted to the hydraulic device 42. The hydraulic device 42 is an actuator capable of controlling the hydraulic pressure of hydraulic oil to be supplied to the brake device (for example, a disc brake device) 53, which is provided on each of the four wheels, based on the hydraulic pressure that has been transmitted from the brake master cylinder BM, and the ECU 23 controls the driving of an electromagnetic valve and the like included in the hydraulic device 42. The ECU 23 is also capable of turning on brake lamps 43B at the time of braking. This enables the following vehicle to give more attention to the vehicle V.

The ECU 23 and the hydraulic device 42 can constitute an electric servo brake. For example, the ECU 23 is capable of controlling distribution of the braking force by the four brake devices 53 and the braking force by the regenerative braking of the motor included in the power plant 50. The ECU 23 is also capable of achieving an anti-lock brake control (ABS) function, traction control, and an attitude control function of the vehicle V, based on detection results of a wheel speed sensor 38 and a yaw rate sensor (not illustrated) provided in each of the four wheels, and a pressure sensor 35, which detects pressure in the brake master cylinder BM.

The ECU 24 is a stoppage-keeping control unit that controls an electric parking brake device (for example, a drum brake) 54, which is provided for rear wheels. The electric parking brake device 54 includes a mechanism for locking the rear wheels. The ECU 24 is capable of controlling locking and unlocking of the rear wheels by the electric parking brake device 54.

The ECU 25 is an in-vehicle notification control unit that controls an information output device 43A, which notifies the inside of the vehicle of information. The information output device 43A includes, for example, a display device provided on a head-up display or an instrument panel, or a sound output device. The information output device 43A may further include a vibration device. The vibration device may be provided, for example, on the steering wheel ST, and is capable of giving a notification by vibrating the steering wheel ST. The ECU 25 causes the information output device 43A to output, for example, several types of information such as a vehicle speed and an outside temperature, information such as route guidance, information about a state of the vehicle V, information about the presence of an obstacle, and the like.

The ECU 26 is a communication control unit and includes a communication device 26a for inter-vehicle communication. The communication device 26a performs wireless communication with another vehicle in the surroundings to exchange information between the vehicles.

The ECU 27 is a driving control unit that controls the power plant 50. In the present embodiment, one ECU 27 is assigned to the power plant 50, however, one ECU may be assigned to each the internal combustion engine, the motor, and the automatic transmission. For example, the ECU 27 controls an output of the internal combustion engine or the motor, or switches a gear ratio of the automatic transmission in accordance with the driver's driving operation, the vehicle speed, and the like that have been detected by an operation detection sensor 34a, which is provided on an accelerator pedal AP, and an operation detection sensor 34b, which is provided on the brake pedal BP. Note that the automatic transmission includes a rotation speed sensor 39, which detects the rotation speed of an output shaft of the automatic transmission, as a sensor that detects a traveling state of the vehicle V. The vehicle speed of the vehicle V can be calculated from a detection result of the rotation speed sensor 39.

The ECU 28 is a position recognition unit that recognizes a current position and a course of the vehicle V. The ECU 28 controls a gyro sensor 33, a GPS sensor 28b, and a communication device 28c, and performs information processing on a detection result or a communication result. The gyro sensor 33 detects a rotational movement of the vehicle V. It is possible to determine the course of the vehicle V from the detection result or the like of the gyro sensor 33. The GPS sensor 28b detects the current position of the vehicle V. The communication device 28c performs wireless communication with a server that provides map information and traffic information, and acquires these pieces of information. A database 28a can store high-accuracy map information, and thus the ECU 28 is capable of identifying the position of the vehicle V in a lane with higher accuracy, based on the map information and the like.

An input device 45 is disposed inside the vehicle to be operable by the driver, and accepts an input of an instruction or information from the driver.

<Application Scene>

FIG. 4 illustrates an example of an application scene of processing in the present embodiment. In the present embodiment, as illustrated in FIG. 4, the self-vehicle V travels in one of two lanes on one side. A traveling lane 420 is a traveling lane between a traveling road boundary 410 and a traveling road boundary 430. A traveling lane 440 is a traveling lane adjacent to the traveling lane 420, and is a traveling lane between the traveling road boundary 430 and a traveling road boundary 450. The traveling road boundary 450 is a center line, and indicates a boundary with respect to an opposite lane.

It is assumed that a traffic signal changes to red and therefore, the self-vehicle V stops, and a group of vehicles 401 to 403 stop ahead of the self-vehicle V in the traveling lane 440 of the self-vehicle V. For example, the self-vehicle V recognizes the group of vehicles 401 to 403 by identifying a plurality of vehicles present within a predetermined range from each other as one group. In FIG. 4, three vehicles (for example, straddle type vehicles) are identified as one group.

In such a situation, it is assumed that the traffic signal changes to green, and each vehicle of the group of vehicles 401 to 403 individually starts moving. A description will be given with regard to, at this timing, what type of acceleration is used to perform the following control, when the self-vehicle V automatically follows a preceding vehicle in accordance with the following control. In the present embodiment, mainly, the following control of following the group of vehicles is conducted, when the self-vehicle V starts moving from a stop state in which the self-vehicle V stops, and in a case where the speed of the self-vehicle is equal to or lower than a predetermined vehicle speed (during low-speed traveling).

<Processing>

Figure 2:
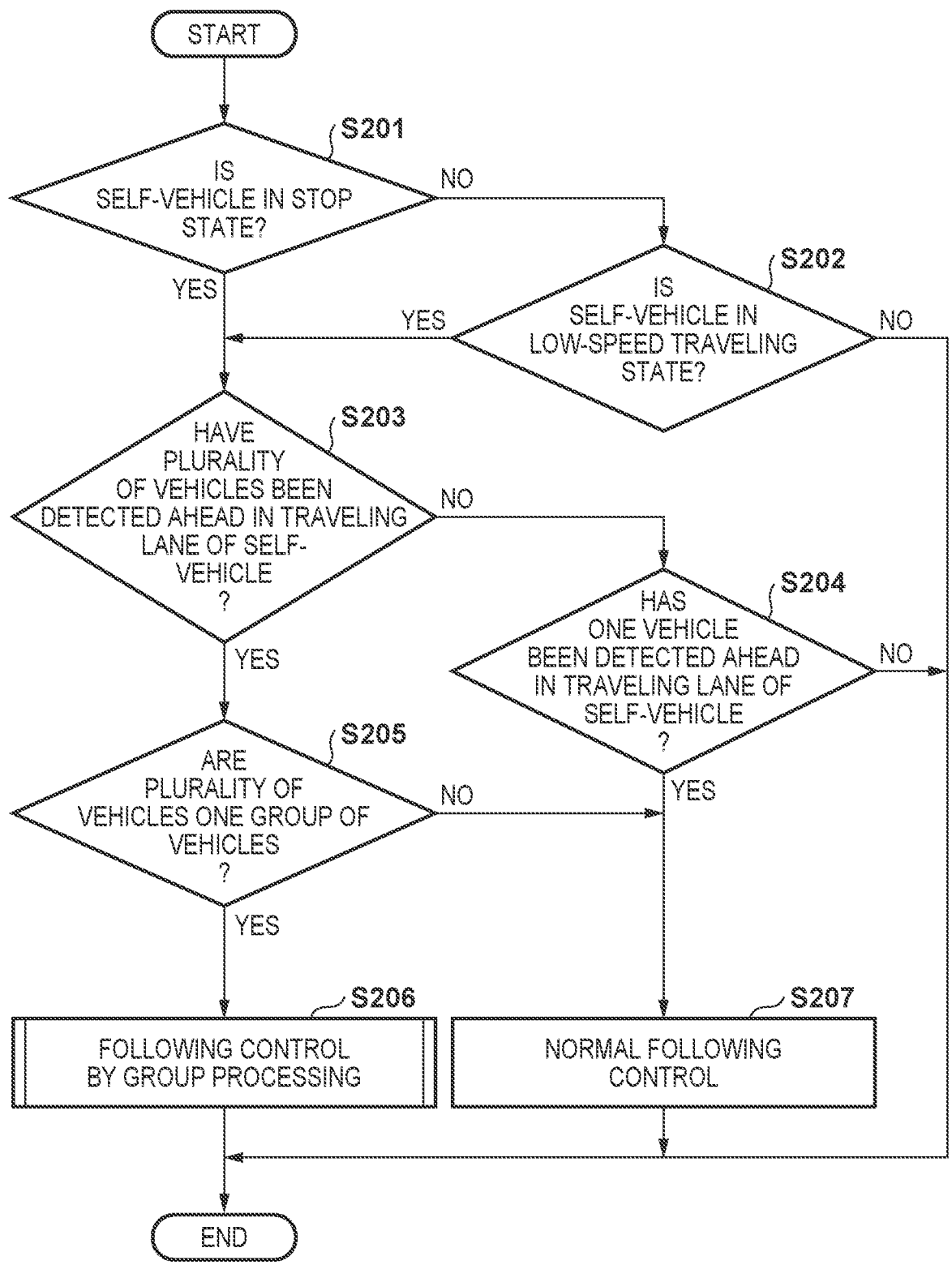
FIG. 2 is a flowchart illustrating a procedure of processing performed by the vehicle control device according to an embodiment.
Figure 3:
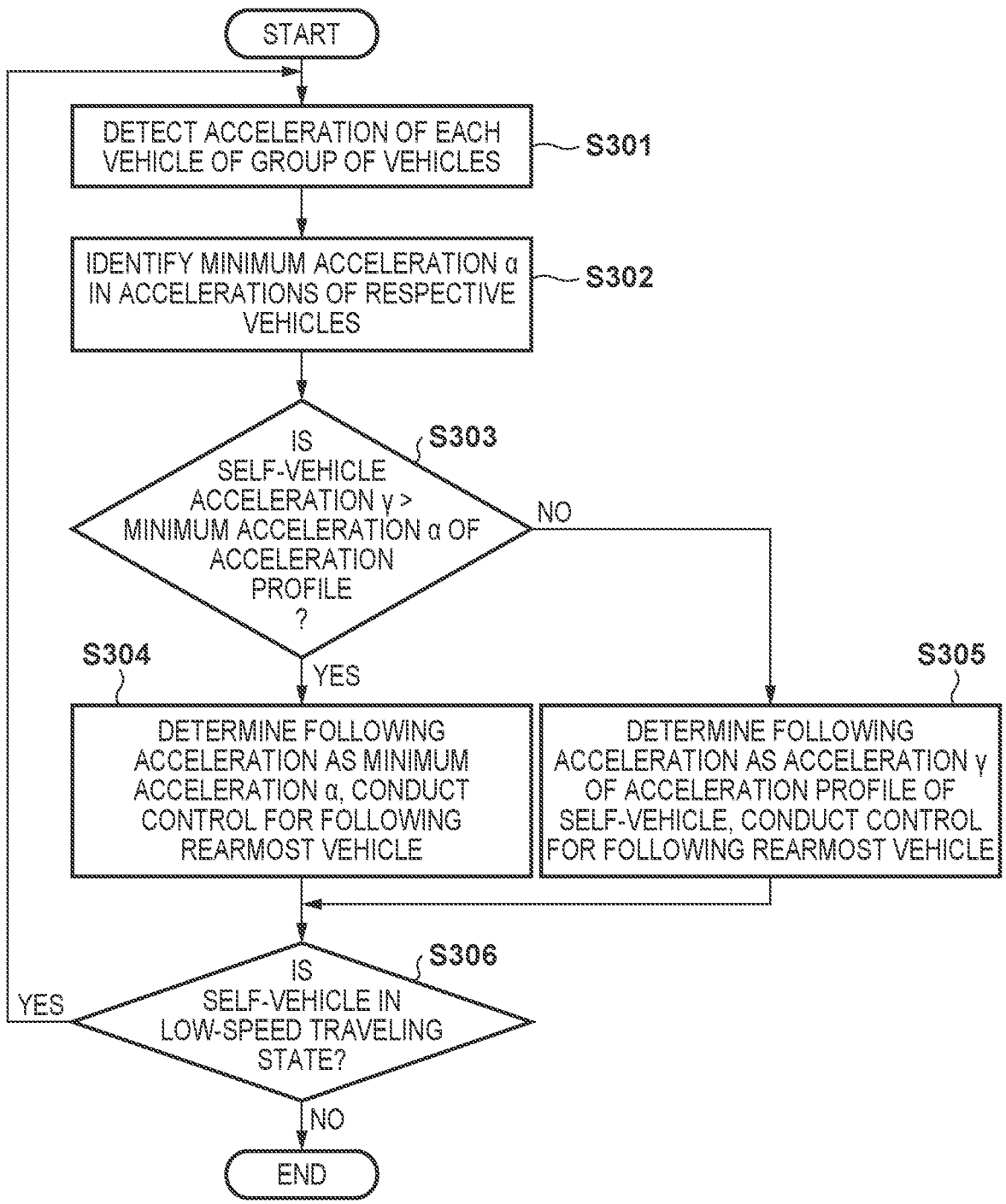
FIG. 3 is a flowchart illustrating a procedure of detailed processing of following control in accordance with group processing according to an embodiment.

FIG. 2 is a flowchart illustrating a procedure of processing performed by the vehicle control device 1 according to the present embodiment. The processing in the present embodiment is, for example, processing to be performed during driving assistance, but is also applicable during automated driving. FIG. 3 is a flowchart illustrating a detailed procedure of the following control processing in accordance with group processing according to the present embodiment.

In S201, the ECU 20 determines whether the self-vehicle Vis in a stop state. In a case where this step is Yes, the processing proceeds to S203. On the other hand, in a case where this step is No, the processing proceeds to S202.

In S202, the ECU 20 determines whether the self-vehicle Vis in a low-speed traveling state. For example, in a case where the vehicle speed of the self-vehicle V is equal to or lower than a predetermined speed (for example, 30 km/h), it may be determined that the self-vehicle V is in the low-speed traveling state. In a case where this step is Yes, the processing proceeds to S203. On the other hand, in a case where this step is No, the processing ends.

In S203, the ECU 21 detects a vehicle present ahead in the traveling lane of the self-vehicle V, and provides information of a detection result for the ECU 20. Then, the ECU 20 determines whether a plurality of vehicles have been detected ahead in the traveling lane of the self-vehicle V, based on the information of the detection result of the ECU 21. In a case where this step is Yes, the processing proceeds to S205. On the other hand, in a case where this step is No, the processing proceeds to S204.

In S204, the ECU 20 determines whether one vehicle has been detected ahead in the traveling lane of the self-vehicle V, based on the information of the detection result of the ECU 21. In a case where this step is Yes, the processing proceeds to S207. On the other hand, in a case where this step is No, that is, in a case where no vehicle has been detected, the processing ends.

In S205, the ECU 20 determines whether the plurality of vehicles that have been detected form one group of vehicles. For example, it is determined whether the plurality of vehicles are present within a predetermined distance range (for example, within a range of a radius of 5 m) from each other, and in a case where the plurality of vehicles are included within the predetermined distance range, the plurality of vehicles are determined as one group of vehicles. Note that in a case where the plurality of vehicles are two-wheeled vehicles and the plurality of vehicles are present within the predetermined distance range from each other, the plurality of vehicles may be recognized as one group of vehicles. Accordingly, even though a two-wheeled vehicle and a four-wheeled vehicle are present within the predetermined distance range from each other ahead of the self-vehicle V, it is possible to conduct control of not recognizing the two-wheeled vehicle and the four-wheeled vehicle as one group of vehicles. In a case where this step is Yes, the processing proceeds to S206. On the other hand, in a case where this step is No, the processing proceeds to S207.

In S206, the ECU 20 conducts the following control in accordance with group processing. The processing of this step will be described later with reference to FIG. 3.

In S207, the ECU 20 conducts normal following control. The normal following control is, for example, control of following a target vehicle ahead while changing the acceleration of the self-vehicle V, based on a predetermined acceleration profile. Heretofore, the processing illustrated in FIG. 2 ends.

Next, details of the following control (S206) in accordance with the group processing according to the present embodiment will be described with reference to the flowchart of FIG. 3.

In S301, the ECU 20 detects accelerations of the respective vehicles in the group of vehicles. For example, the ECU 26 receives information of the acceleration from each vehicle on inter-vehicle communication between the self-vehicle V and each vehicle by use of the communication device 26a, and the ECU 20 is capable of detecting the acceleration of each vehicle. Alternatively, the ECU 26 may receive the vehicle speed information from each vehicle on the inter-vehicle communication between the self-vehicle V and each vehicle by use of the communication device 26a, and the ECU 20 may detect a temporal change in the vehicle speed of each vehicle as the acceleration.

In S302, the ECU 20 identifies a minimum acceleration $\alpha$ out of the acceleration of the respective vehicles. In FIG. 4, the acceleration of the vehicle 401 is the minimum acceleration $\alpha$.

In S303, the ECU 20 determines whether an acceleration $\gamma$ of the self-vehicle in accordance with the predetermined acceleration profile is larger than the minimum acceleration $\alpha$. Here, the predetermined acceleration profile is a profile in which changes in the acceleration of the self-vehicle V in accordance with the lapse of time are defined beforehand, and is an acceleration profile used in the normal following control conducted in S207 of FIG. 2. In a case where this step is Yes, the processing proceeds to S304. On the other hand, in a case where this step is No, the processing proceeds to S305.

In S304, the ECU 20 determines a following acceleration of the self-vehicle V as the minimum acceleration $\alpha$, and conducts control of following a rearmost vehicle. In FIG. 4, the rearmost vehicle is the vehicle 403, and the following control of following the vehicle 403 is conducted. The following control is conducted to be apart from the rearmost vehicle by a target inter-vehicle distance or more.

In S305, the ECU 20 determines the following acceleration of the self-vehicle V as the acceleration $\gamma$ of the acceleration profile of the self-vehicle V, and conducts the control of following the rearmost vehicle. The following control is conducted to be apart from the rearmost vehicle by a target inter-vehicle distance or more.

Figure 5:
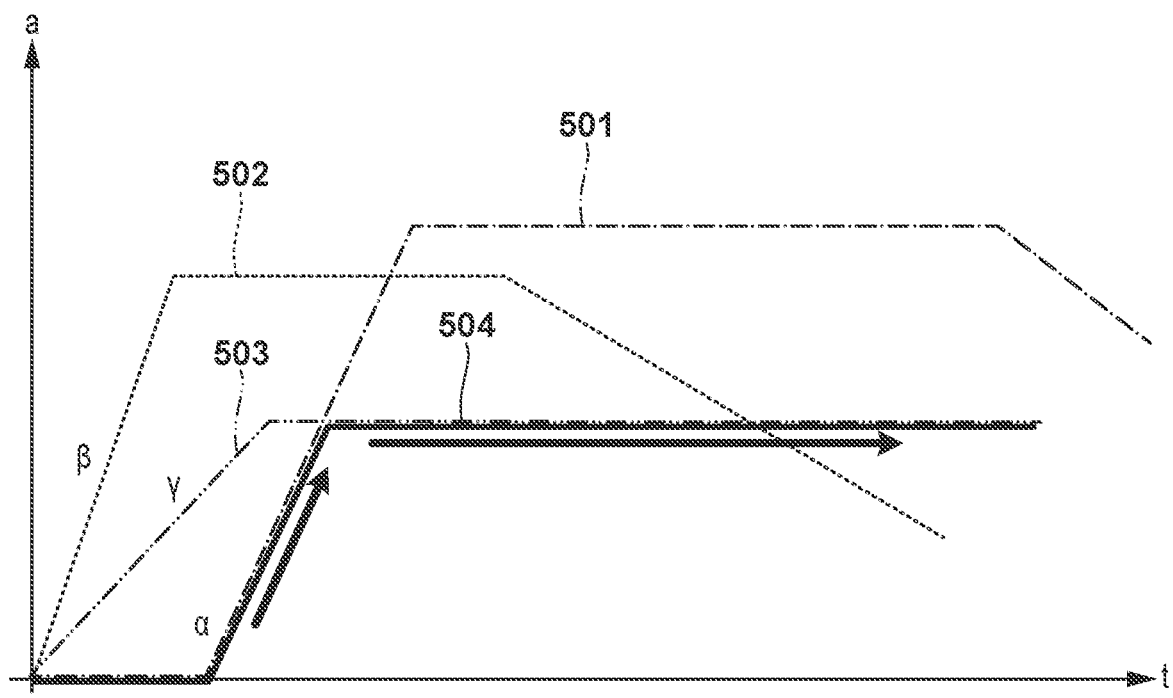
FIG. 5 is a diagram illustrating an example of acceleration of a self-vehicle determined by the following control in accordance with the group processing according to an embodiment.

Here, FIG. 5 is an explanatory diagram illustrating an example of a method for determining the following acceleration of the self-vehicle V according to the present embodiment, and is a diagram while the inter-vehicle distance is small at the time of starting to move. The vertical axis represents acceleration a, and the horizontal axis represents time t. An acceleration 501 indicates a temporal change in the acceleration (the minimum acceleration $\alpha$) of the vehicle 401 in FIG. 4. An acceleration 502 indicates a temporal change in the acceleration (an acceleration $\beta$) of the vehicle 403 in FIG. 4. An acceleration profile 503 is a profile in which changes in the acceleration of the self-vehicle V in accordance the lapse of time are defined beforehand, and indicates predetermined temporal changes in the acceleration (the acceleration $\gamma$) of the self-vehicle V. An acceleration 504 indicates the following acceleration of the self-vehicle V. While the acceleration $\gamma$ in the acceleration profile 503 of the self-vehicle V is larger than the minimum acceleration $\alpha$ of the vehicle 401, the minimum acceleration $\alpha$ is determined as the following acceleration of the self-vehicle V. This corresponds to S304. Then, while the acceleration $\gamma$ of the acceleration profile 503 of the self-vehicle Vis equal to or smaller than the minimum acceleration $\alpha$ of the vehicle 401, the acceleration $\gamma$ of the acceleration profile 503 of the self-vehicle V is determined as the following acceleration of the self-vehicle V. This corresponds to S305. That is, in the example of FIG. 5, the following acceleration of the self-vehicle V is controlled to change as indicated by the acceleration 504. In this manner, it is possible to determine the following acceleration so that the smallest acceleration of the respective accelerations of the respective vehicles included in the group of vehicles becomes an upper limit.

In S306, the ECU 20 determines whether the self-vehicle Vis in the low-speed traveling state. For example, in a case where the vehicle speed of the self-vehicle V is equal to or lower than a predetermined speed (for example, 30 km/h), it may be determined that the self-vehicle V is in the low-speed traveling state. In a case where this step is Yes, the processing returns to S301. On the other hand, in a case where this step is No, the processing ends.

As described heretofore, in the present embodiment, in a case where a plurality of vehicles ahead of the self-vehicle V are recognized as one group of vehicles, the following acceleration of the self-vehicle V is determined, based on the minimum acceleration of the respective accelerations of the respective vehicles included in the group of vehicles. Then, the target vehicle is determined, based on respective distances from the self-vehicle V to the respective vehicles, and the following control of following the target vehicle is conducted with the following acceleration that has been determined.

For example, in a case where the acceleration of the rearmost vehicle in the group of vehicles is large and the acceleration of a foremost vehicle or an intermediate vehicle is small, if automatically following the rearmost vehicle, based on the acceleration of the rearmost vehicle or based on the acceleration profile of the self-vehicle, the self-vehicle V will rapidly get closer to the foremost vehicle or the intermediate vehicle in the group of vehicles. As a result, there is a possibility that a sudden braking operation occurs. However, according to the present embodiment, it is possible to suppress excessively getting closer to the rearmost vehicle and an occurrence of the sudden braking operation. Therefore, it becomes possible to improve the riding comfort of the occupant, and it is possible to achieve the following control in accordance with natural driving support and automated driving with less sense of incongruity. Therefore, even though a target to be followed is in a group including a plurality of vehicles, comfortable following travel is enabled.

[Modifications]

In the above-described embodiment, the example has been described in which the minimum acceleration $\alpha$ of the accelerations of the respective vehicles in the group of vehicles is used (that is, a comparison between the minimum acceleration $\alpha$ as illustrated in FIG. 3 and the acceleration $\gamma$ of the acceleration profile of the self-vehicle V), but is not limited to this example. For example, a second smallest acceleration may be used. That is, in the processing of FIG. 3, the following acceleration may be determined by comparing the second smallest acceleration with the acceleration $\gamma$ of the acceleration profile of the self-vehicle V. Alternatively, an average value (an average acceleration) of the accelerations of the respective vehicles in the group of vehicles may be used. In the processing of FIG. 3, for example, the following acceleration may be determined by comparing the average value of the accelerations with the acceleration $\gamma$ of the acceleration profile of the self-vehicle V. In this manner, the following acceleration of the self-vehicle may be determined, based on the acceleration smaller than the maximum acceleration of the respective accelerations of the respective vehicles included in the group of vehicles.

Furthermore, with no consideration given to the acceleration γ of the acceleration profile of the self-vehicle V, the following acceleration may be determined, based on the smallest acceleration of the respective accelerations of the respective vehicles included in the group of vehicles. For example, the smallest acceleration may be determined as the following acceleration of self-vehicle V, or acceleration smaller than the smallest acceleration by a predetermined value (or a predetermined rate) may be determined as the following acceleration.

In the above-described embodiment, the example has been described in which in a case where a plurality of vehicles are included within a predetermined distance range from each other, the plurality of vehicles are determined as one group of vehicles, but is not limited to this. For example, information indicating that these vehicles form one group may be received from at least one of the vehicles on the inter-vehicle communication between the self-vehicle V and each vehicle by use of the communication device 26a. For example, in a case where three vehicles have been detected ahead, information indicating that three two-wheeled vehicles form one group is received from at least one of these three vehicles, and three two-wheeled vehicles have been detected ahead of the self-vehicle V, the three two-wheeled vehicles that have been detected may be determined as one group of vehicles.

In the above-described embodiment, the example has been described in which the following control is conducted to be apart from the target vehicle by the target inter-vehicle distance or more. Here, the target inter-vehicle distance may be changeable. For example, the target inter-vehicle distance may be determined, based on the number of vehicles included in one group. The target inter-vehicle distance may be controlled to increase, as the number of vehicles included in one group increases. Alternatively, in a case where the number of vehicles included in one group is equal to or larger than a threshold value, the control may be conducted to be apart by a first target inter-vehicle distance or more, and in a case where the number of vehicles included in one group is smaller than the threshold value, the control may be conducted to be apart by a second target inter-vehicle distance shorter than the first target inter-vehicle distance.

Furthermore, a plurality of threshold values may be provided, and the target inter-vehicle distance may be changed in a stepwise manner with each threshold as a boundary. For example, in a case where the number of vehicles is equal to or larger than a first threshold, the control may be conducted to be apart by a first target inter-vehicle distance or more, in a case where the number of vehicles is smaller than the first threshold and is equal to or larger than a second threshold, the control may be conducted to be apart by a second target inter-vehicle distance or more, the second target inter-vehicle distance being shorter than the first target inter-vehicle distance, and in a case where the number of vehicles is smaller than the second threshold, the control may be conducted to be apart by a third target inter-vehicle distance or more, the third target inter-vehicle distance being shorter than the second target inter-vehicle distance.

In the above-described embodiment, the following control has been described in which it is mainly conducted at the time of starting to move, and in a case where the vehicle speed is equal to or lower than the predetermined vehicle speed (during low-speed traveling). On the other hand, the inter-vehicle distance at the time of stopping may be changed depending on whether the group of vehicles is recognized also at the time of stopping. For example, in a case where a plurality of vehicles are not recognized as one group, control may be conducted such that when the self-vehicle V stops from the traveling state, the self-vehicle V stops at a first distance from a target vehicle. In addition, in a case where a plurality of vehicles are recognized as one group, control may be conducted so that when the self-vehicle V stops from the traveling state in which the self-vehicle V is traveling, the self-vehicle V stops at a second distance, which is larger than the first distance, from the target vehicle. In this manner, in the case where the group of vehicles is traveling ahead of the self-vehicle V, when the self-vehicle stops while following, the control is conducted so that the inter-vehicle distance becomes larger than that in the normal following control, it becomes possible to conduct the following control with higher safety.

Other Embodiments

In addition, a program for achieving one or more functions that have been described in each embodiment is supplied to a system or an apparatus through a network or a storage medium, and one or more processors in a computer of the system or the apparatus are capable of reading and executing such a program. The present invention is also achievable in such an aspect.

Summary of Embodiments

1. The vehicle control device (1) according to the above embodiments is a vehicle control device comprising:
   a recognition unit (20, 21) configured to recognize a vehicle ahead of a self-vehicle (V); and
   a control unit (20) configured to conduct following control of following a target vehicle, based on a recognition result of the recognition unit, wherein
   in a case where a plurality of vehicles (401, 402, 403) are recognized as a group by the recognition unit, the control unit determines a following acceleration of the self-vehicle, based on an acceleration smaller than a maximum acceleration of respective accelerations of respective vehicles included in the group, and determines the target vehicle, based on respective distances from the self-vehicle to the respective vehicles, and
   the control unit conducts the following control of following the target vehicle at the following acceleration determined.

Accordingly, it is possible to suppress excessively getting closer to the preceding vehicle and an occurrence of a sudden braking operation. Therefore, it becomes possible to improve the riding comfort of the occupant, and it is possible to achieve the following control in accordance with natural driving support and automated driving with less sense of incongruity. Therefore, even though a target to be followed is in a group including a plurality of vehicles, comfortable following travel is enabled.

2. In the vehicle control device (1) according to the above embodiments,
   in a case where the plurality of vehicles are two-wheeled vehicles and the plurality of vehicles are present within a predetermined distance range from each other, the recognition unit recognizes the plurality of vehicles as the group, and in a case where the plurality of vehicles are four-wheeled vehicles, the recognition unit does not recognize the plurality of vehicles as the group.

In this manner, in a case where the preceding vehicles are two-wheeled vehicles, the group processing is performed, so that, for example, the following control of following the group of two-wheeled vehicles that are doing touring is achievable with less sense of incongruity.

3. In the vehicle control device (1) according to the above embodiments, the control unit determines the following acceleration such that a smallest acceleration of the respective accelerations of the respective vehicles included in the group becomes an upper limit.

Accordingly, it is possible to achieve comfortable following control in which excessively getting closer to the group of vehicles and an occurrence of a sudden braking operation are suppressed.

4. In the vehicle control device (1) according to the above embodiments, the control unit determines the following acceleration, based on a smallest acceleration of the respective accelerations of the respective vehicles included in the group.

Accordingly, it is possible to achieve comfortable following control in which excessively getting closer to the group of vehicles and an occurrence of a sudden braking operation are suppressed.

5. In the vehicle control device (1) according to the above embodiments, the control unit determines the following acceleration, based on a predetermined acceleration profile in which a change in the acceleration of the self-vehicle is defined in accordance with a lapse of time and the smallest acceleration of the respective accelerations of the respective vehicles included in the group.

Accordingly, control of an adaptive following acceleration is enabled, and it is possible to achieve comfortable following control in which excessively getting closer to the group of vehicles and an occurrence of a sudden braking operation are suppressed.

6. In the vehicle control device (1) according to the above embodiments, the control unit determines the smallest acceleration as the following acceleration, while the smallest acceleration is smaller than the acceleration of the self-vehicle in the predetermined acceleration profile.

Accordingly, control of an adaptive following acceleration is enabled, and it is possible to achieve comfortable following control in which excessively getting closer to the group of vehicles and an occurrence of a sudden braking operation are suppressed.

7. In the vehicle control device (1) according to the above embodiments, the control unit determines the acceleration of the self-vehicle in the predetermined acceleration profile as the following acceleration, while the acceleration of the self-vehicle in the predetermined acceleration profile is equal to or smaller than the smallest acceleration.

Accordingly, control of an adaptive following acceleration is enabled, and it is possible to achieve comfortable following control in which excessively getting closer to the group of vehicles and an occurrence of a sudden braking operation are suppressed.

8. In the vehicle control device (1) according to the above embodiments, the recognition unit recognizes the plurality of vehicles ahead in a traveling lane (44) of the self-vehicle, as the group.

In this manner, the processing is performed to be limited to the group of vehicles in the traveling lane excluding vehicles ahead (vehicles diagonally ahead) of the self-vehicle in an adjacent lane, so that the processing speed can be improved. Even though a group of vehicles (for example, a plurality of two-wheeled vehicles while doing touring) is present in both the traveling lane of the self-vehicle and its adjacent lane, the processing is limited to the traveling lane of the self-vehicle, so that it is possible to suppress the distance to the preceding vehicle in the traveling lane from being excessively apart.

9. In the vehicle control device (1) according to the above embodiments, when the self-vehicle starts to move from a stop state in which the self-vehicle stops and in a case where the self-vehicle moves at equal to or lower than a predetermined vehicle speed, the control unit conducts the following control.

In this manner, by performing the following processing in accordance with the group processing in a low-speed region during acceleration from the time of starting to move, the following control more suitable for a situation is enabled.

10. In the vehicle control device (1) according to the above embodiments, the target vehicle is a rearmost vehicle (403) of the plurality of vehicles included in the group, and the control unit conducts the following control such that a distance between the rearmost vehicle and the self-vehicle is equal to or longer than a target inter-vehicle distance.

Accordingly, it is possible to achieve comfortable following control in which excessively getting closer to the group of vehicles and an occurrence of a sudden braking operation are suppressed.

11. In the vehicle control device (1) according to the above embodiments, the control unit conducts the following control such that a distance between the target vehicle and the self-vehicle is equal to or longer than a target inter-vehicle distance, and the control unit determines the target inter-vehicle distance, based on the number of the plurality of vehicles included in the group.

Accordingly, it becomes possible to maintain an adaptive inter-vehicle distance in accordance with the number of vehicles in the group of vehicles.

12. In the vehicle control device (1) according to the above embodiments, the control unit conducts control of increasing the target inter-vehicle distance, as the number of the plurality of vehicles included in the group increases.

In this manner, by increasing the inter-vehicle distance in a case where there are a large number of vehicles in the group of vehicles, even though a vehicle that behaves unpredictably is present, more safe following control is achievable.

13. In the vehicle control device (1) according to the above embodiments, in a case where the plurality of vehicles are not recognized as the group by the recognition unit, and when the vehicle stops from a traveling state in which the self-vehicle is traveling, the control unit causes the self-vehicle to stop at a first distance from the target vehicle, and in a case where the plurality of vehicles are recognized as the group by the recognition unit, and when the self-vehicle stops from the traveling state in which the self-vehicle is traveling, the control unit causes the self-vehicle to stop at a second distance from the target vehicle, the second distance being longer than the first distance.

In this manner, in the case of performing the group processing, even though a vehicle that behaves unpredictably is present, by stopping to be apart from the preceding vehicle, more safe following control is achievable than the case of not performing the group processing.

14. In the vehicle control device (1) according to the above embodiments,
the control unit determines the following acceleration, based on an average acceleration of the respective accelerations of the respective vehicles included in the group.

Accordingly, it is possible to achieve comfortable following control in which excessively getting closer to the group of vehicles and an occurrence of a sudden braking operation are suppressed.

15. The operation method of a vehicle control device (1) according to the above embodiments is an operation method of a vehicle control device, the operation method comprising:
a recognition step (S203) of recognizing a vehicle ahead of a self-vehicle (V); and
a control step (S205) of conducting following control of following a target vehicle, based on a recognition result of the recognition unit, wherein
in a case where a plurality of vehicles (401, 402, 403) are recognized as a group by the recognition unit, the control step determines a following acceleration of the self-vehicle, based on an acceleration smaller than a maximum acceleration of respective accelerations of respective vehicles included in the group, and determines the target vehicle, based on respective distances from the self-vehicle to the respective vehicles, and
the control step conducts the following control of following the target vehicle at the following acceleration determined (S301~S305).

Accordingly, it is possible to suppress excessively getting closer to the preceding vehicle and an occurrence of a sudden braking operation. Therefore, it becomes possible to improve the riding comfort of the occupant, and it is possible to achieve the following control in accordance with natural driving support and automated driving with less sense of incongruity. Therefore, even though a target to be followed is in a group including a plurality of vehicles, comfortable following travel is enabled.

16. The program according to the above embodiments is a program for causing a computer to execute the operation method of the vehicle control device according to the above embodiments.

Accordingly, the function of the vehicle control device is achievable as a program.

17. The storage medium according to the above embodiments is a non-transitory computer-readable storage medium storing a program for causing a computer to execute the operation method of the vehicle control device according to the above embodiments.

Accordingly, the function of the vehicle control device is achievable as a storage medium.

According to the present invention, comfortable following travel is enabled, in a case where a target to be followed is a group including a plurality of vehicles.

The invention is not limited to the foregoing embodiments, and various variations/changes are possible within the spirit of the invention.

What is claimed is:

1. A vehicle control device comprising:
a recognition unit configured to recognize a vehicle ahead of a self-vehicle; and
a control unit configured to conduct following control of following a target vehicle, based on a recognition result of the recognition unit, wherein
in a case where a plurality of vehicles are recognized as a group by the recognition unit, the control unit determines a following acceleration of the self-vehicle, based on i) a predetermined acceleration profile in which a change in the acceleration of the self-vehicle is defined in accordance with a lapse of time and ii) a smallest acceleration of respective accelerations of respective vehicles included in the group, and determines the target vehicle, based on respective distances from the self-vehicle to the respective vehicles, and
the control unit conducts the following control of following the target vehicle at the following acceleration determined.

2. The vehicle control device according to claim 1, wherein
in a case where the plurality of vehicles are two-wheeled vehicles and the plurality of vehicles are present within a predetermined distance range from each other, the recognition unit recognizes the plurality of vehicles as the group, and
in a case where the plurality of vehicles are four-wheeled vehicles, the recognition unit does not recognize the plurality of vehicles as the group.

3. The vehicle control device according to claim 1, wherein the control unit determines the following acceleration such that the smallest acceleration of the respective accelerations of the respective vehicles included in the group becomes an upper limit.

4. The vehicle control device according to claim 1, wherein the control unit determines the smallest acceleration as the following acceleration, while the smallest acceleration is smaller than the acceleration of the self-vehicle in the predetermined acceleration profile.

5. The vehicle control device according to claim 1, wherein the control unit determines the acceleration of the self-vehicle in the predetermined acceleration profile as the following acceleration, while the acceleration of the self-vehicle in the predetermined acceleration profile is equal to or smaller than the smallest acceleration.

6. The vehicle control device according to claim 1, wherein the recognition unit recognizes the plurality of vehicles ahead in a traveling lane of the self-vehicle, as the group.

7. The vehicle control device according to claim 1, wherein when the self-vehicle starts to move from a stop state in which the self-vehicle stops and in a case where the self-vehicle moves at equal to or lower than a predetermined vehicle speed, the control unit conducts the following control.

8. The vehicle control device according to claim 1, wherein
the target vehicle is a rearmost vehicle of the plurality of vehicles included in the group, and the control unit conducts the following control such that a distance between the rearmost vehicle and the self-vehicle is equal to or longer than a target inter-vehicle distance.

9. A vehicle control device comprising:
a recognition unit configured to recognize a vehicle ahead of a self-vehicle; and
a control unit configured to conduct following control of following a target vehicle, based on a recognition result of the recognition unit, wherein
in a case where a plurality of vehicles are recognized as a group by the recognition unit, the control unit determines a following acceleration of the self-vehicle, based on an acceleration smaller than a maximum acceleration of respective accelerations of respective vehicles included in the group, and determines the target vehicle, based on respective distances from the self-vehicle to the respective vehicles, and
the control unit conducts the following control of following the target vehicle at the following acceleration determined, and wherein
the control unit conducts the following control such that a distance between the target vehicle and the self-vehicle is equal to or longer than a target inter-vehicle distance, and
the control unit determines the target inter-vehicle distance, based on the number of the plurality of vehicles included in the group,
wherein the control unit conducts control of increasing the target inter-vehicle distance, as the number of the plurality of vehicles included in the group increases.

10. The vehicle control device according to claim 9, wherein the control unit determines the following acceleration, based on an average acceleration of the respective accelerations of the respective vehicles included in the group.

11. A vehicle control device comprising:
a recognition unit configured to recognize a vehicle ahead of a self-vehicle; and
a control unit configured to conduct following control of following a target vehicle, based on a recognition result of the recognition unit, wherein
in a case where a plurality of vehicles are recognized as a group by the recognition unit, the control unit determines a following acceleration of the self-vehicle, based on an acceleration smaller than a maximum acceleration of respective accelerations of respective vehicles included in the group, and determines the target vehicle, based on respective distances from the self-vehicle to the respective vehicles, and
the control unit conducts the following control of following the target vehicle at the following acceleration determined, wherein
in a case where the plurality of vehicles are not recognized as the group by the recognition unit, and when the vehicle stops from a traveling state in which the self-vehicle is traveling, the control unit causes the self-vehicle to stop at a first distance from the target vehicle, and
in a case where the plurality of vehicles are recognized as the group by the recognition unit, and when the self-vehicle stops from the traveling state in which the self-vehicle is traveling, the control unit causes the self-vehicle to stop at a second distance from the target vehicle, the second distance being longer than the first distance.

12. An operation method of a vehicle control device, the operation method comprising:
a recognition step of recognizing a vehicle ahead of a self-vehicle; and
a control step of conducting following control of following a target vehicle, based on a recognition result of the recognition unit, wherein in
a case where a plurality of vehicles are recognized as a group by the recognition unit, the control step determines a following acceleration of the self-vehicle, based on i) a predetermined acceleration profile in which a change in the acceleration of the self-vehicle is defined in accordance with a lapse of time and ii) a smallest acceleration of respective accelerations of respective vehicles included in the group, and determines the target vehicle, based on respective distances from the self-vehicle to the respective vehicles, and
the control step conducts the following control of following the target vehicle at the following acceleration determined.

13. A non-transitory computer-readable storage medium storing a program for causing a computer to execute the operation method of the vehicle control device of claim 12.

14. An operation method of a vehicle control device comprising:
recognizing a vehicle ahead of a self-vehicle; and
conducting following control of following a target vehicle, based on a result of the recognizing, wherein
in a case where a plurality of vehicles are recognized as a group by the recognition unit,
determining a following acceleration of the self-vehicle, based on an acceleration smaller than a maximum acceleration of respective accelerations of respective vehicles included in the group, and
determining the target vehicle, based on respective distances from the self-vehicle to the respective vehicles, and
conducting the following control of following the target vehicle at the following acceleration determined, and wherein
conducting the following control such that a distance between the target vehicle and the self-vehicle is equal to or longer than a target inter-vehicle distance, and
determining the target inter-vehicle distance, based on the number of the plurality of vehicles included in the group,
wherein the control of increasing the target inter-vehicle distance is conducted as the number of the plurality of vehicles included in the group increases.

15. A non-transitory computer-readable storage medium storing a program for causing a computer to execute the operation method of the vehicle control device of claim 14.

16. An operation method of a vehicle control device, comprising:
recognizing a vehicle ahead of a self-vehicle; and
conducting following control of following a target vehicle, based on a result of the recognizing, wherein
in a case where a plurality of vehicles are recognized as a group,
determining a following acceleration of the self-vehicle, based on an acceleration smaller than a maximum acceleration of respective accelerations of respective vehicles included in the group, and
determining the target vehicle, based on respective distances from the self-vehicle to the respective vehicles, and conducting the following control of following the target vehicle at the following acceleration determined, wherein in a case where the plurality of vehicles are not recognized as the group, and when the vehicle stops from a traveling state in which the self-vehicle is traveling, causing the self-vehicle to stop at a first distance from the target vehicle, and in a case where the plurality of vehicles are recognized as the group, and when the self-vehicle stops from the traveling state in which the self-vehicle is traveling, causing the self-vehicle to stop at a second distance from the target vehicle, the second distance being longer than the first distance.

17. A non-transitory computer-readable storage medium storing a program for causing a computer to execute the operation method of the vehicle control device of claim 16.

* * * * *